(12) United States Patent
Boyle

(10) Patent No.: US 6,980,522 B2
(45) Date of Patent: Dec. 27, 2005

(54) AD-HOC RADIO COMMUNICATION SYSTEM

(75) Inventor: Kevin R. Boyle, Horshaw (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 772 days.

(21) Appl. No.: 09/797,085

(22) Filed: Mar. 1, 2001

(65) Prior Publication Data

US 2001/0012757 A1 Aug. 9, 2001

(30) Foreign Application Priority Data

Feb. 3, 2000 (GB) ................................ 0004919

(51) Int. Cl.⁷ .............................................. H04J 1/16
(52) U.S. Cl. ...................................... 370/252; 370/338
(58) Field of Search ................................ 370/338, 349, 370/252

(56) References Cited

U.S. PATENT DOCUMENTS

| | | | | |
|---|---|---|---|---|
| 4,549,293 A | * | 10/1985 | Christian et al. | 370/347 |
| 5,551,066 A | * | 8/1996 | Stillman et al. | 455/69 |
| 5,682,381 A | * | 10/1997 | Sekihata et al. | 370/332 |
| 5,850,593 A | * | 12/1998 | Uratani | 370/327 |
| 5,907,540 A | * | 5/1999 | Hayashi | 370/349 |
| 6,026,303 A | * | 2/2000 | Minamisawa | 455/446 |
| 6,118,773 A | * | 9/2000 | Todd | 370/334 |
| 6,167,282 A | * | 12/2000 | Hunsberger | 455/513 |
| 6,178,323 B1 | * | 1/2001 | Nagata | 455/416 |
| 6,266,528 B1 | * | 7/2001 | Farzaneh | 455/423 |
| 6,377,805 B1 | * | 4/2002 | Anvekar et al. | 455/436 |
| 6,424,837 B1 | * | 7/2002 | Hall et al. | 455/456.5 |
| 6,434,113 B1 | * | 8/2002 | Gubbi | 370/338 |
| 6,470,189 B1 | * | 10/2002 | Hill et al. | 370/338 |
| 6,650,871 B1 | * | 11/2003 | Cannon et al. | 455/41.2 |
| 6,654,614 B2 | * | 11/2003 | Morris et al. | 455/426.1 |
| 6,693,891 B1 | * | 2/2004 | Sugita et al. | 370/336 |
| 6,711,409 B1 | * | 3/2004 | Zavgren et al. | 370/335 |

FOREIGN PATENT DOCUMENTS

| WO | WO0103379 | 1/2001 |
|---|---|---|
| WO | WO0106824 | 2/2001 |

* cited by examiner

Primary Examiner—Andy Lee

(57) ABSTRACT

In an ad-hoc radio communication system comprising a plurality of stations (100) formed into at least one network (102a, 102b), each station (100) is assigned a rank representative of its suitability for performing the role of master station in a network (102a). The rank may for example be assessed depending on the performance of the station's antenna (204) or its access to mains power. It is arranged that the station (100) having the highest rank in a network (102a, 102b) performs the role of master for that network, thereby improving the efficiency of communication in the network.

9 Claims, 2 Drawing Sheets

AD-HOC RADIO COMMUNICATION SYSTEM

The present invention relates to a radio communication system comprising a plurality of stations capable of forming an ad-hoc network. Although the present invention is described with particular reference to a Bluetooth system, it is applicable to any other communication system in which stations are able to form an ad-hoc network.

An example of a radio communication system which enables the formation of ad-hoc networks is a Bluetooth network, operating according to the specification defined by the Bluetooth Special Interest Group. Such a network is intended to provide low-cost, short range radio links between mobile PCs, mobile phones and other devices, whether portable or not.

Communication in a Bluetooth network takes place in the unlicensed ISM band at around 2.45 GHz. Stations form ad-hoc networks which are known as piconets, each comprising a master station and up to seven slave stations. All stations are identical and capable of acting as master or slave as required. A station can take part in more than one piconet, thereby linking piconets and enabling communication over an extended range.

An object of the present invention is to improve the operational efficiency of an ad-hoc wireless network.

According to a first aspect of the present invention there is provided an ad-hoc radio communication system comprising a plurality of stations formed into at least one network, each station comprising transceiver means coupled to antenna means for communication with other stations, control means for performing the role of master or slave in a network and ranking means for determining a rank representative of the station's suitability for acting as master in the network, wherein at least one of the stations has comparison means for determining the rank of all the stations in the network and master transfer means for enabling the station having the highest rank to take the role of master in the network.

According to a second aspect of the present invention there is provided a station for use in an ad-hoc radio communication system comprising a plurality of stations formed into at least one network, wherein transceiver means coupled to antenna means are provided for communication with other stations, control means are provided to enable the station to perform the role of master or slave as required in a network, ranking means are provided for determining a rank representative of the station's suitability for acting as master in the network, inquiry means are provided for determining the rank of other stations in the network, and master transfer means are provided capable of performing at least one of the actions of taking over the role of master, if the station is a slave and has the highest rank in the network, and transferring the role of master to a second station, if the station is the master and does not have the highest rank in the network.

According to a third aspect of the present invention there is provided a method of operating an ad-hoc radio communication system comprising a plurality of stations formed into at least one network, each station comprising transceiver means coupled to antenna means for communication with other stations, being able to function as master or slave in a network and being able to determine a rank representative of the station's suitability for acting as master in the network, the method comprising at least one of the stations determining the rank of all the stations in the network and arranging for the role of master to be taken by the station having the highest rank.

Embodiments of the present invention will now be described, by way of example, with reference to the accompanying drawings, wherein.

In the drawings the same reference numerals have been used to indicate corresponding features.

Figure 1:
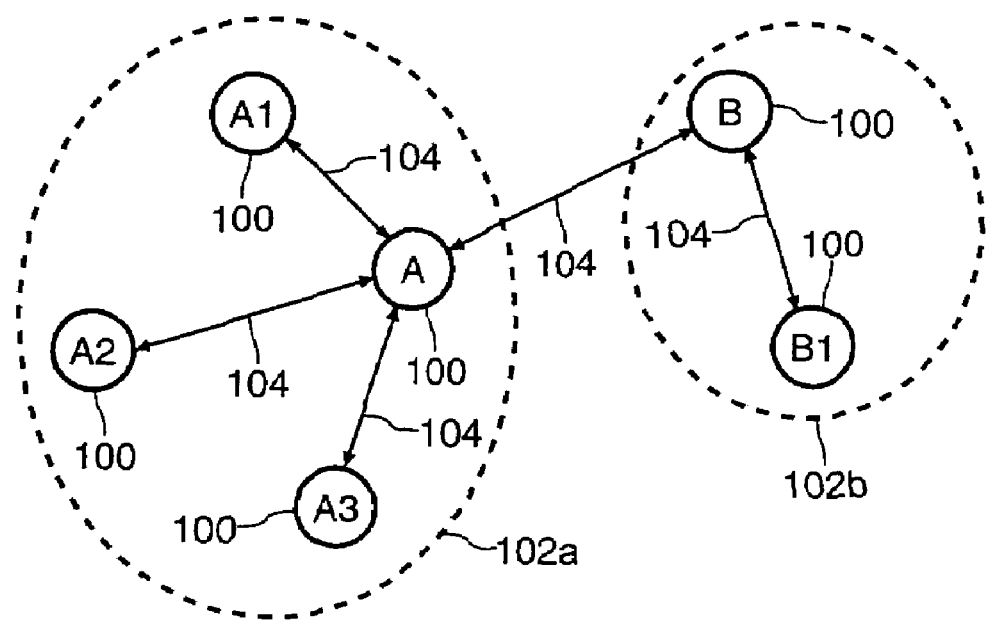
FIG. 1 is a diagram of an ad-hoc wireless network comprising two linked piconets.

A basic ad-hoc network configuration is illustrated in FIG. 1. Such a configuration would typically begin with two connected host devices, for example a portable PC and a cellular phone, and grow to include additional connected devices. A wide range of additional host devices may be included, for example wireless headsets, personal organisers and home entertainment equipment. The network comprises a plurality of stations 100, each included in such a host device, formed into two piconets 102a,102b. In general the networking components (i.e. the Bluetooth chip for a Bluetooth network) of all stations 100 will be implemented identically. However, it is only necessary that all stations 100 comprising the network are able to operate according to a compatible protocol.

The first piconet 102a is a point-to-multipoint network comprising four stations 100, a master A and three slaves A1,A2,A3, with bidirectional communication channels 104 between the master A and each of the slaves A1,A2,A3. The second piconet 102b is a point-to-point network comprising a master B and a slave B1. Communication between the piconets 102a,102b is enabled by the master A in the first piconet 102a also acting as a slave in the second piconet 102b and vice versa. It is not necessary for the link between the piconets 102a,102b to be between masters: it would be equally possible for the link to be between stations A3 and B1 or between A and B1, for example.

Figure 2:
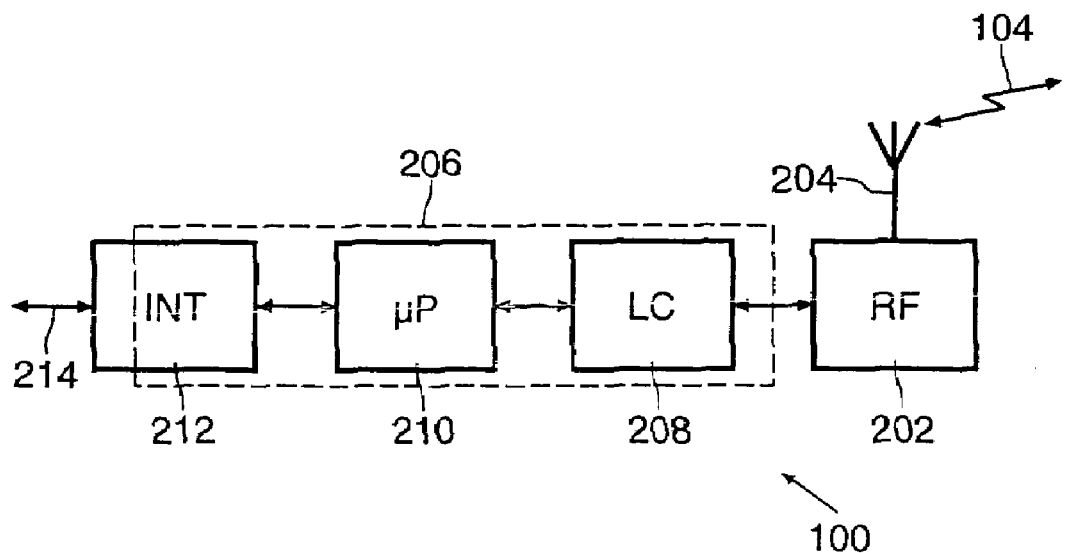
FIG. 2 is a block schematic diagram of a typical Bluetooth station.

An example of a station 100 for use in a Bluetooth system is illustrated in more detail in FIG. 2, and comprises two main sections. The first section is an analogue unit comprising a radio (RF) 202 having an antenna 204 for transmitting and receiving radio signals on the communication channel 104. The second section is a digital controller unit 206, further comprising a link baseband controller (LC) 208, a microprocessor ($\mu$P) 210 and an interface unit (INT) 212.

The link controller 208 comprises means for performing baseband processing and execution of basic protocols close to the physical layer, for example implementing error correction coding, generating Automatic Repeat reQuests (ARQ) and performing audio coding. The microprocessor 210 manages the station 100, controlling data transfer between the interface unit 212 and the link controller 208. The interface unit 212 comprises hardware and software for interfacing the station 100 to a host device such as a portable PC or a cellular phone. The interfacing is performed via a link 214, which might include interfaces to a USB (Universal Serial Bus), external memory and other items as appropriate for the particular application.

A problem with the implementation of ad-hoc networks, such as those described above, is that it is possible for a station 100 having an inefficient antenna 204 to operate as the master. There can be a wide range of reasons for an inefficient antenna 204, including:

the antenna 204 having an inherently poor efficiency;

the antenna 204 having a radiation pattern providing poor coverage of other stations 100;

antenna mismatch, perhaps caused by the local environment of the station 100;

a shadowing of the antenna 204, for example by the station 100, the host device or a user's body; and polarisation coupling loss, if the polarisation of antenna 204 in the master is not aligned with that in one or more of the slaves.

This problem is solved in a system made in accordance with the present invention by ranking each station 100 in terms of its antenna performance. A station 100 having the best antenna ranking then preferentially becomes the master. The antenna ranking can be determined under static conditions, or it may be adjusted dynamically depending on the local environment of a station 100, for example based on measured VSWR or some other signal quality measure. A station 100 capable of antenna diversity would be given a high ranking because of the advantages this confers. The stations 100 may determine their antenna rankings relative to one another, enabling an optimum master station to be chosen.

The selection of master station requires the stations 100 to compare their rankings. One way in which this can be accomplished is for the master station to request each of the other stations 100 to provide their rankings, using standard Bluetooth communication protocols. If the master station determines that its ranking is lower than one of its slave stations then it hands over the master role to that station, using the normal methods defined in the Bluetooth specification.

Handover of the master function from one station 100 to another needs to be possible as new stations 100 join the network, and is provided for in a Bluetooth system. It is also desirable to enable handover of the master function to mitigate the effects of position-dependent fading.

As an example of a system in accordance with the present invention consider a Bluetooth piconet 102a comprising three devices: a laptop PC using antennas 204 located in a slot-in PC card; a wireless headset; and a home telephony base station. The base station has the highest ranking antenna system, because of its size, possibly diversity, and a position that is not badly shadowed. The PC card has a miniature antenna 204 and is shadowed by the PC, and therefore has a lower ranking antenna 204. The headset includes a very small and inefficient antenna 204 with losses to the user's head, significant shadowing and poorly defined polarisation, and therefore has the lowest ranking antenna 204.

Initially the network begins with communication between the PC and the headset. Because of its higher antenna ranking the PC becomes master in this piconet 102a. When the base station joins the network, for example to enable Internet access by the PC, the base station will become master because it has the highest ranking antenna 204.

Figure 3:
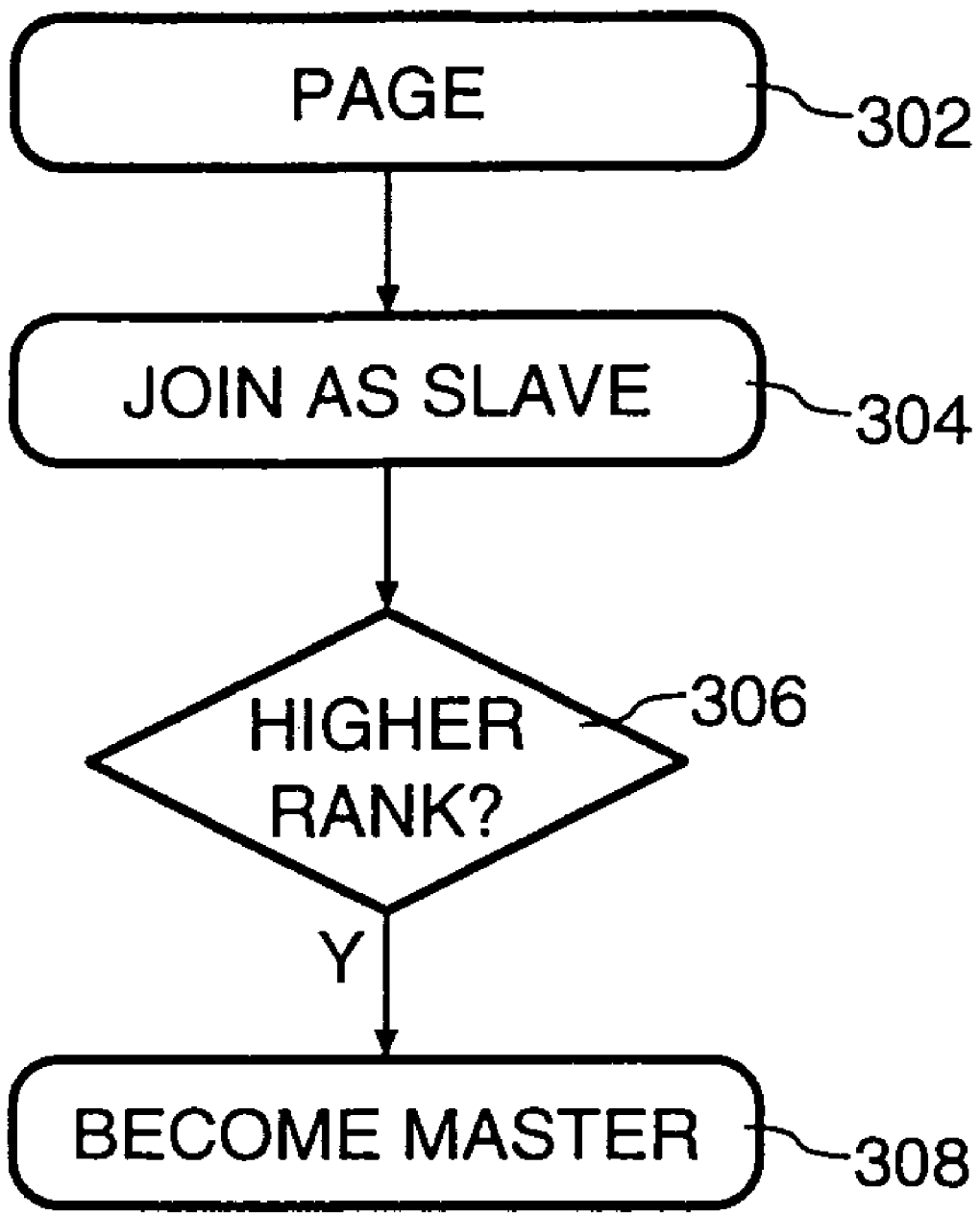
FIG. 3 is a flow chart illustrating a method in accordance with the present invention for a new station joining an ad-hoc wireless network.

This procedure is summarised in the flow chart of FIG. 3. When a new station 100 (here the base station) is required in the piconet 102a the master transmits, at step 302, a paging message to the station 100. The station initially joins the network as a slave, at step 304, and then compares the ranking of its antenna with the other stations 100 in the piconet 102a, at step 306. If the station 100 determines that its antenna ranking is higher than any of the other stations 100 it initiates the required procedure to become master itself, at step 308, using the methods defined in the Bluetooth specification to perform this procedure. Alternatively, the master station could compare its ranking with that of the slave station when the slave joints the network and hand over the master function if required.

An ad-hoc network 102a may also include links to a planned network, for example a conventional cellular telephone network. In such a case the master for the ad-hoc network need not be the station 100 which accesses the planned network. For example, consider an ad-hoc network 100a comprising a WAP (Wireless Access Protocol) mobile phone (or a Personal Digital Assistant, PDA) used to access the Internet via the planned network. The phone has a Bluetooth connection to a headset and another connection to a television set, to use its larger screen for displaying more information than the phone is able to. In this situation the television would act as the Bluetooth master, since it is large (and can support efficient antennas) and is unlikely to be shadowed by the user's body, or anything else.

In situations where more than one of the stations 100 is able to access the same planned network, it may be advantageous for a similar ranking scheme to that described above to be employed for access to the planned network. As an example of such a scenario, consider a Bluetooth network including a UMTS (Universal Mobile Telecommunication System) mobile phone and a UMTS-enabled laptop computer. The user could simply use the phone in the conventional manner while the laptop acts as both master in the ad-hoc network and as the access point to the UMTS network, because it has a better antenna (possibly including diversity) and is clear of the user's body. Since the laptop could be shadowed by nearby objects, the optimum master station and UMTS access point could of course be determined dynamically.

Although the description above describes the ranking of stations 100 based on their antenna performance, other factors might usefully be taken into account in the ranking, either instead of or in addition to the antenna performance. For example, a station 100 having access to mains electricity would be particularly suitable as a master because the extra power needed to perform the role of master would not present the same problem of reduced battery life faced by a battery-powered device.

From reading the present disclosure, other modifications will be apparent to persons skilled in the art. Such modifications may involve other features which are already known in the design, manufacture and use of radio communication systems and component parts thereof, and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention. The applicants hereby give notice that new claims may be formulated to such features and/or combinations of features during the prosecution of the present application or of any further application derived therefrom.

In the present specification and claims the word "a" or "an" preceding an element does not exclude the presence of a plurality of such elements. Further, the word "comprising" does not exclude the presence of other elements or steps than those listed.

What is claimed is:

1. An ad-hoc radio communication system comprising a plurality of stations formed into at least one network, wherein at least one station including transceiver means coupled to antenna means for communication with other stations, control means for enabling master or slave functionality in the station and ranking means for determining a rank representative of the station's suitability for acting as master in the network using performance characteristics of the antenna means in view of its local environment, wherein at least one of the stations has comparison means for determining the rank of all the stations in the network and master transfer means for enabling the station having the highest rank to take the role of master in the network.

2. The system as claimed in claim 1, wherein the comparison means are operated by the master station.

3. A station for use in an ad-hoc radio communication system having a plurality of stations formed into at least one network, the station comprising: transceiver means coupled to antenna means for communication with other stations, control means to enable master or slave functionality in a network, ranking means for determining a rank representative of the station's suitability for acting as master in the network using performance characteristics of the antenna means in view of its local environment, inquiry means for determining the rank of other stations in the network.

4. The station as claimed in claim 3, wherein the performance of the antenna means is determined dynamically.

5. The station as claimed in claim 3, wherein the ranking means determines the rank of the station depending on its access to mains power.

6. A method of operating an ad-hoc radio communication system having a plurality of stations formed into at least one network, the method comprising the step of:

determining a master/slave rank of each station in the network representative of the station's suitability for acting as master in the network using antenna performance characteristics of each station in view of the antenna's local environment; and enabling a station with the highest rank to be master.

7. The method as claimed in claim 6, characterised by determining the performance of the antenna means dynamically.

8. The method as claimed in claim 6, characterised by determining the rank of a station depending on its access to mains power.

9. The station of claim 3, further including master transfer means for performing at least one of the actions of taking over the role of master, if the station is a slave and has the highest rank in the network, and transferring the role of master to a second station, if the station is the master and does not have the highest rank in the network.

* * * * *